(12) United States Patent
Yoshida et al.

(10) Patent No.: US 7,046,774 B2
(45) Date of Patent: May 16, 2006

(54) INTERCOM APPARATUS

(75) Inventors: Kazuya Yoshida, Nagoya (JP);
Manabu Yamada, Nagoya (JP);
Masaya Mizutani, Nagoya (JP)

(73) Assignee: Aiphone Co., Ltd., Nagoya (JP)

( * ) Notice: Subject to any disclaimer, the term of this patent is extended or adjusted under 35 U.S.C. 154(b) by 0 days.

(21) Appl. No.: 10/420,856

(22) Filed: Apr. 23, 2003

(65) Prior Publication Data

US 2003/0223561 A1 Dec. 4, 2003

(30) Foreign Application Priority Data

May 30, 2002 (JP) ............................. 2002-157789

(51) Int. Cl.
*H04M 11/00* (2006.01)
*H04M 1/60* (2006.01)

(52) U.S. Cl. ............. 379/102.06; 379/159; 379/167.01

(58) Field of Classification Search .......... 379/106.01, 379/110.01, 167.01, 167.04, 167.07, 167.11–167.15, 379/102.06, 159, 438, 442, 445; 439/55, 439/445; D14/159

See application file for complete search history.

(56) References Cited

U.S. PATENT DOCUMENTS 6,014,544 A * 1/2000 Shinozaki et al. ............ 725/12

6,603,842 B1 * 8/2003 Elberbaum ............. 379/106.01

FOREIGN PATENT DOCUMENTS

| JP | 09018562 A | * | 1/1997 |
| JP | 09064563 A | * | 3/1997 |
| JP | 10106656 A | * | 4/1998 |
| JP | 2000278431 A | * | 10/2000 |

* cited by examiner

*Primary Examiner*—George Eng
(74) *Attorney, Agent, or Firm*—Bacon & Thomas, PLLC

(57) ABSTRACT

An intercom apparatus has a main line connecting intercom master stations in respective residential rooms. Each master station has a terminal unit which is separate from and removable from the master station, so that the terminal unit can be removed according to need while keeping the connection. The intercom apparatus further has an entrance substation by which the master stations in residential rooms may be called from the entrance substation through the main line for bilateral communication. The terminal unit has terminals for connecting with intercom master stations by a station-to-station spanning wiring forming the main line and a terminal board on which the terminals are mounted for electrical connection with the main line path. A mounting bracket, by which the terminal unit is detachably mounted, is provided in a space which is formed in the backside of the intercom master station.

10 Claims, 9 Drawing Sheets

INTERCOM APPARATUS

CROSS-REFERENCE TO RELATED APPLICATION

This application claims, under 35 USC 119, priority of Japanese Application No. 2002-157789 filed May 30, 2002.

BACKGROUND OF THE INVENTION

1. Field of the Invention

This invention relates to an intercom apparatus and, more specifically, to an intercom apparatus having a terminal unit which can be separated from an intercom master station.

2. Related Art

A conventional intercom apparatus (see, FIG. 1) has one or more entrance substations and a plurality of intercom master stations respectively located in residential rooms and called from the entrance substation through a main communication line for bilateral communication with the entrance substation. A terminal base is disposed at the backside of the intercom master station and electrically connected to a board formed integrally with the intercom master station.

In such an intercom apparatus wiring coming from the residential room is directly connected to the terminal base disposed at the backside of the intercom master station and to the intercom master station in the next residential room, and intercom master stations in respective residential rooms are connected in sequence.

In the intercom master station of the above-described intercom apparatus of the related art, there is the drawback that it can not be applied where main bodies of the intercom main station do not exist at an installation location. Further, since the main bodies of the intercom master station must be wired, it is hard to make the wire connection and there is the possibility that the apparatus may be dropped and broken carelessly. Furthermore, if the intercom master station is broken or has a defect requiring maintenance, that entire intercom master station must be disconnected and, by removing one intercom main station from the main communication line, the entire intercom system is disabled.

Moreover, since during the period between installation and occupancy, the main bodies of the intercom master station can not be moved, there is a drawback that they are can become dirty in the installation location, and there is the possibility that intercom master stations may be stolen from the installation locations during that period.

SUMMARY OF THE INVENTION

Accordingly, an object of the present invention is to solve the above-mentioned drawbacks and to provide an intercom apparatus which allows for connection of intercom master stations in respective residential rooms by installation of a removable terminal unit which can be removed without changing a wire connection.

To accomplish the foregoing objective, an intercom apparatus of the invention has one or more entrance substations which are disposed at an entrance and a plurality of intercom master stations which are located in respective residential rooms and called from the entrance substation through a main line for bilateral communication with the entrance substation. The intercom apparatus includes a terminal unit which comprises terminals for wiring between the plurality of intercom master stations by station-to-station spanning wiring to form the main line communication and a terminal board for mounting the terminals and for making electrical connection of the main line communication by with the station-to-station spanned wiring. The intercom master station has a mounting bracket for detachably mounting the terminal unit.

Further, in the intercom apparatus of the invention, the mounting bracket is disposed at the backside of the intercom master station and preferably in a space which is formed at the backside of a CRT module which serves as a monitor and which displays a picture taken by a camera of the entrance substation.

In a preferred embodiment, the terminal unit has projections which are inserted into guide grooves in the mounting bracket of the intercom master station, and the intercom master station has a locking portion for securing the terminal unit to the intercom master station so that an end face of the chassis of the terminal unit which covers the terminals and the terminal board, is engaged by sliding orthogonal to the direction of insertion of the terminal unit.

With the above embodiment of the intercom apparatus of the invention, insertion of the terminal unit into the intercom master station, an electrical connection is made by insertion of a connector on the terminal board into a socket on a main printed circuit board inside the intercom master station.

Furthermore, the mounting bracket of the intercom apparatus of the invention may have a storage space beneath the terminal unit for storing a lead wire for an electrical connection between the intercom master station and the terminal unit.

The terminal chassis may have a lead wire guide for guiding and storing a lead wire extending from the intercom master station.

Further, another embodiment of the intercom apparatus of the invention has a locking mechanism which locks the chassis of the terminal unit in place upon insertion of said terminal unit into the mounting bracket of the intercom master station.

Furthermore, in another embodiment of the intercom apparatus of the invention, the terminal unit is mounted in an opening of a wall hanging attachment, for attaching the intercom master station to a wall, by locking arms which are disposed on the terminal unit, and the intercom master station has a storage space for receiving the terminal unit which is mounted on the wall hanging attachment.

Moreover, in preferred embodiments of the intercom apparatus of the invention, an electrical connection is made by inserting a connector disposed on a terminal board in the terminal unit into a socket disposed on the main printed circuit board in the intercom master station.

The exterior chassis of the terminal unit may form part of an outer housing of the intercom master station.

In another embodiment of the intercom apparatus of the invention, the terminals of the terminal unit are mounted on a side surface of the intercom master station so that the station-to-station wiring of the main communication line is exposed.

The terminal unit is removable from the intercom main station so that in cases where the intercom master station has a defect and the terminal unit is removed from the intercom apparatus, the entire apparatus is not disabled. Further, since the terminal unit of the intercom master station is readily removed from the intercom apparatus, theft of the intercom main station during the period between installation and occupancy can be prevented.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Hereinafter, preferred embodiments of the present invention will be described with reference to the drawings.

Figure 1:
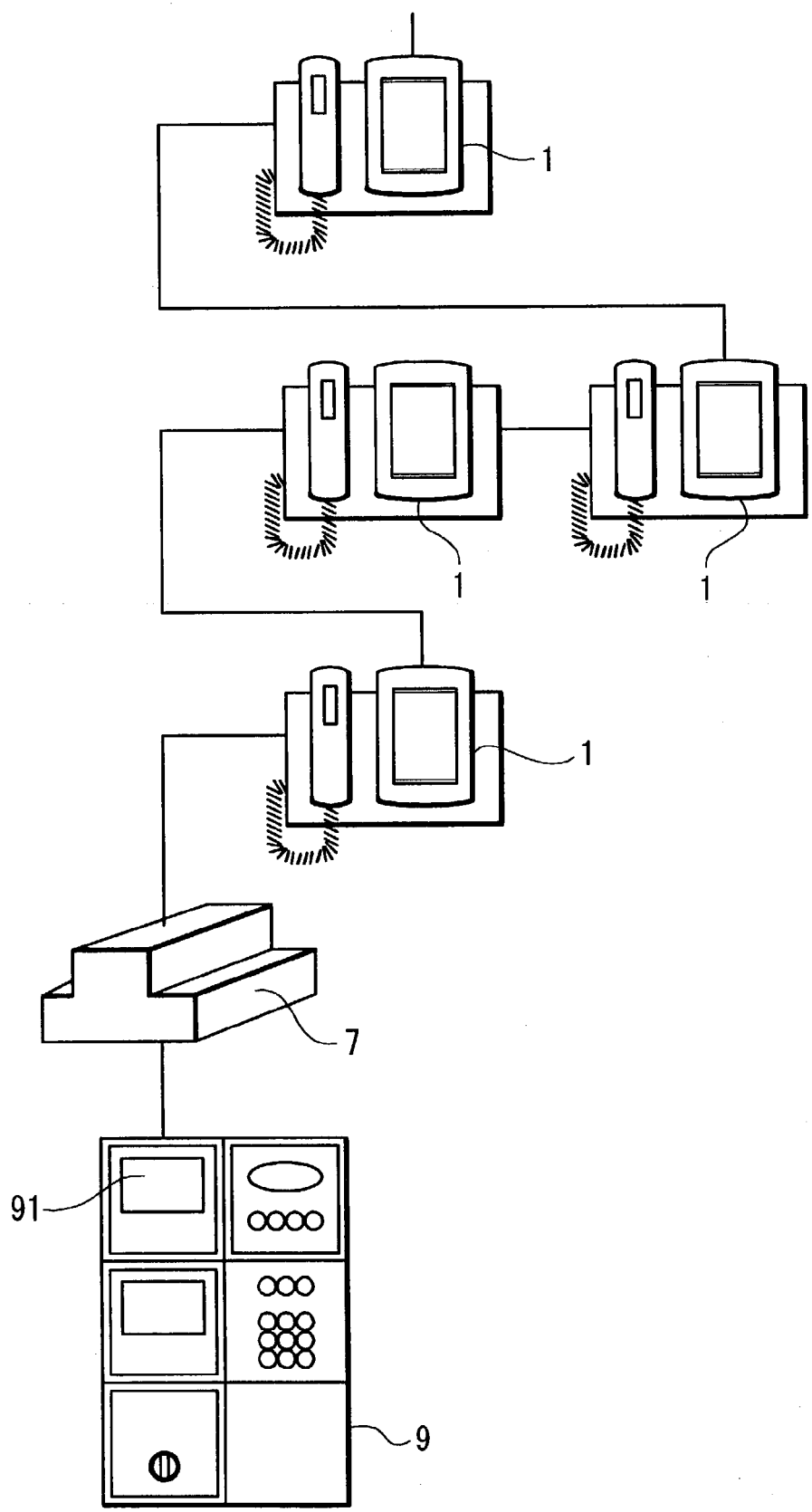
FIG. 1 is a schematic view of overall a structure of an intercom apparatus.

An intercom apparatus of the invention has, as shown in FIG. 1, one or more entrance substations 9 which are mounted at an entrance, a plurality of intercom master stations 1,1, . . . which are disposed in residential rooms (apartments) and which can be called from the entrance substation 9 through a main line path providing bilateral communication between the entrance substation 9 and an intercom master station. An image bus controller 7 supplies electric power to a camera 91 of the entrance substation 9 and intercom master stations 1,1, . . . and amplifies image signals from the camera 91. The plurality of the intercom master stations 1,1, . . . are wire-connected by station-to-station spanning wiring.

Figure 2:
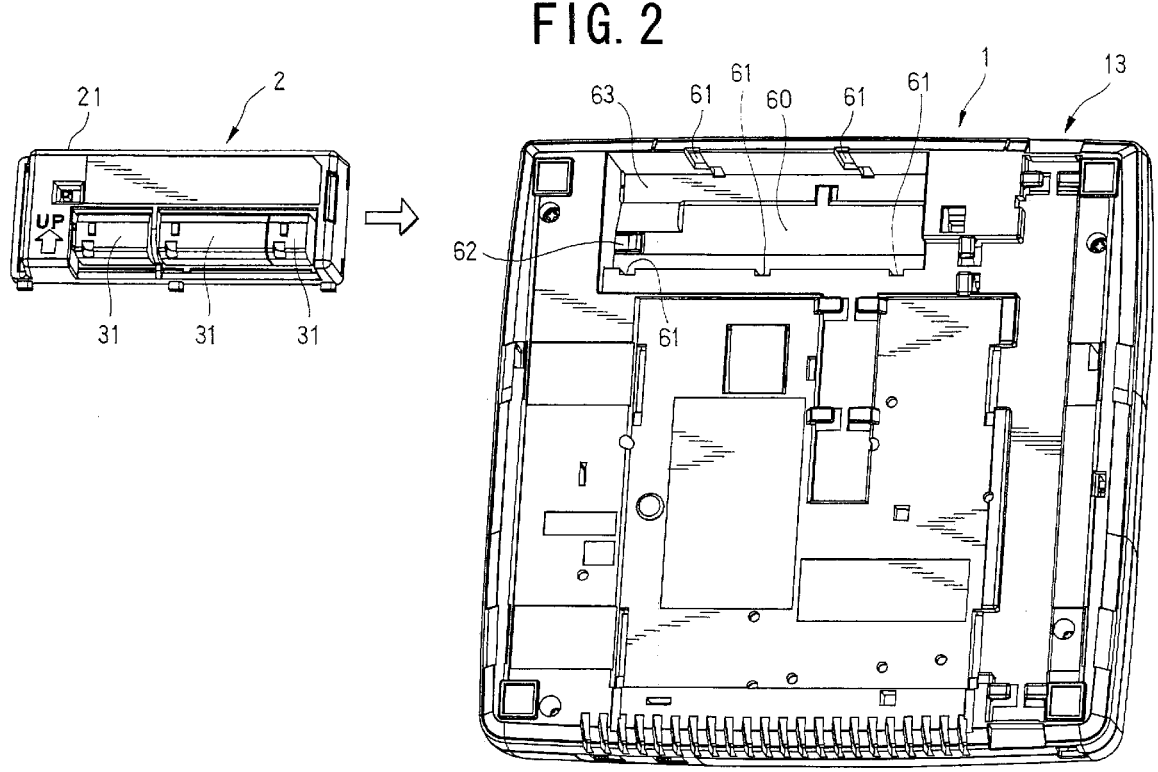
FIG. 2 is a perspective view of the rear of an intercom master station 1 and a terminal unit 2 of an intercom apparatus according to the invention.

As shown in FIG. 2, a terminal unit 2 is mounted on the intercom master station 1, and as shown in FIGS. 2, 4(a) and 4(b), the terminal unit 2 comprises terminals 31 for forming a main communication line and a terminal board 30 in which the terminals 31 are mounted and electric connection of station-to-station spanning wiring is made to establish the main communication line. As further shown in FIG. 2, the intercom master station 1 has, on its back surface 13, a mounting bracket 60 for detachably mounting the terminal unit 2.

Figure 3:
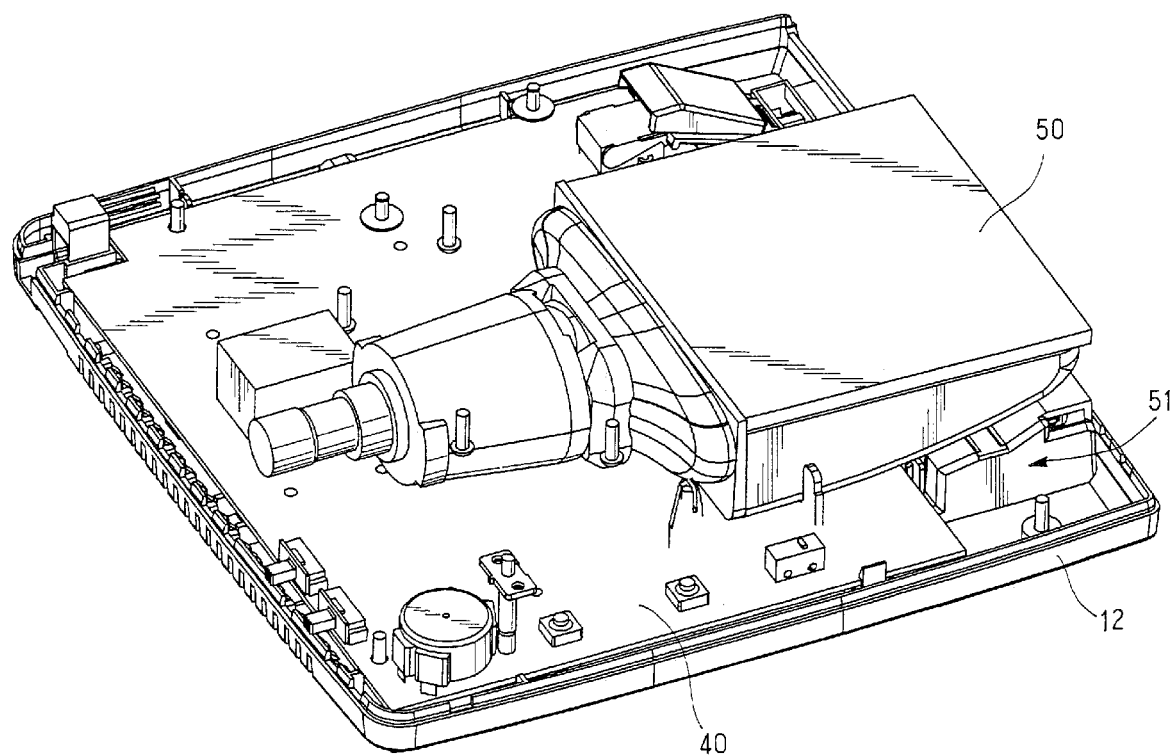
FIG. 3 is a perspective view showing a CRT module mounted in an intercom master station 1 of an intercom apparatus according to the invention.
Figure 5:
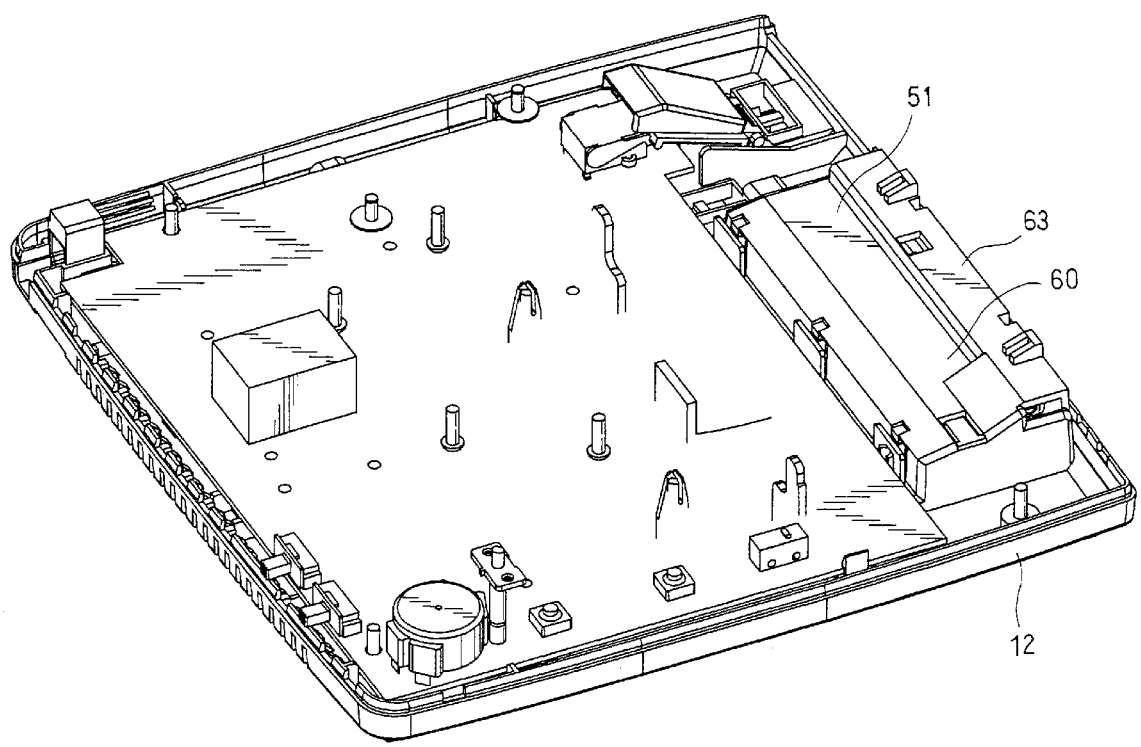
FIG. 5 is a view of the internal structure of an intercom master station 1 of an intercom apparatus of the invention with the CRT module shown in FIG. 3 removed.

It is preferred that the mounting bracket 60 be disposed, as shown in FIGS. 3 and 5, in a space 51 in the rear chassis 12, behind a CRT module 50 which serves as a monitor for displaying images which are taken by the camera 91 (see, FIG. 1) of the entrance substation 9, from the viewpoint of utilization of vacant space.

As shown in FIGS. 2, 4(a) and 4(b), the terminal unit 2 has a plurality of projections 22,22, . . . which are inserted into a plurality of guide grooves 61, 61, . . . formed in the mounting bracket 60 of the intercom master station 1. The intercom master station 1 has a locking portion 62 for fitting the terminal unit 2 to the intercom master station 1 to engage an end face of the chassis 21 of the terminal unit 2, which covers the terminals 31 and the terminal board 30, by moving the terminal unit 2 orthogonal to the direction of insertion of the terminal unit 2.

The terminal unit 2 is fixed by a sliding movement when it is mounted on the mounting bracket 60 of the intercom master station 1.

Figure 4:
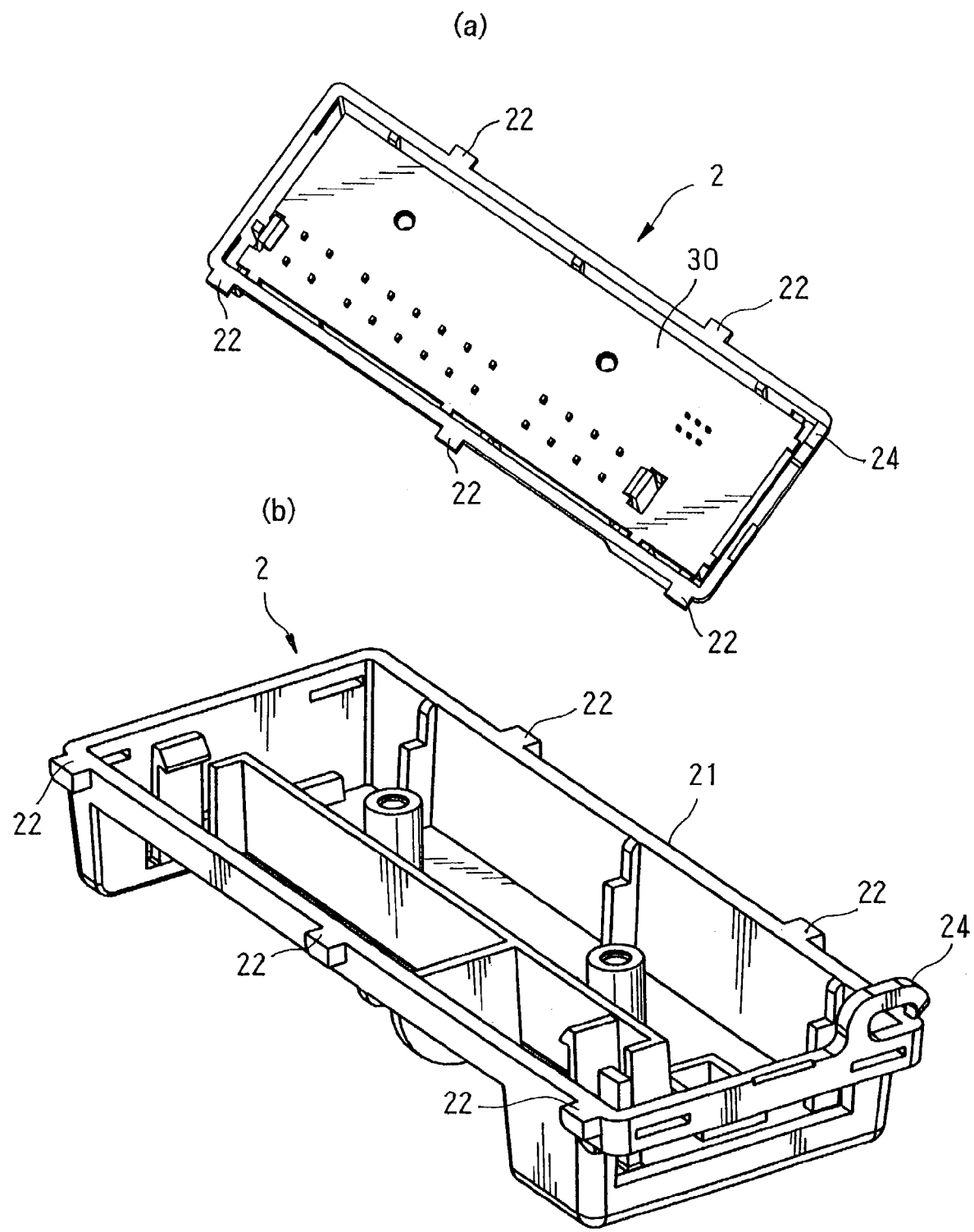
FIGS. 4(a) and 4(b) are perspective views of a terminal unit of the intercom apparatus of the invention showing a terminal board and a projection and a lead wire guide, respectively.

As shown in FIG. 2, by sliding the terminal unit 2 onto the mounting bracket 60 of the intercom master station 1, the end face of the chassis 21 of the terminal unit 2 is fitted to the locking portion 62 and the projections 22 (FIG. 4 (a)) of the terminal unit 2 are fitted into the guide grooves 61 of the intercom master station 1 so that the terminal unit 2 is thereby fixed in position.

Figure 6:
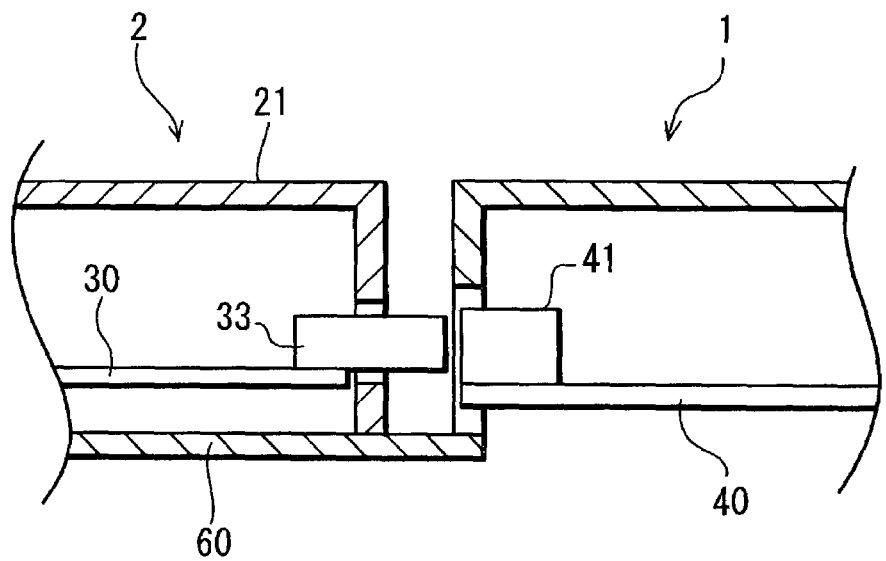
FIG. 6 is a partial schematic view in cross-section, illustrating connection of an intercom master station and a terminal unit in an intercom apparatus of the invention.

Further, in fitting (mounting) the terminal unit 2 in the intercom master station 1, as shown in FIG. 6, a connector 33 on the terminal board 30 of the terminal unit 2 is inserted into a socket 41 on a main board 40 of the intercom master station 1 to make an electrical connection.

Figure 10:
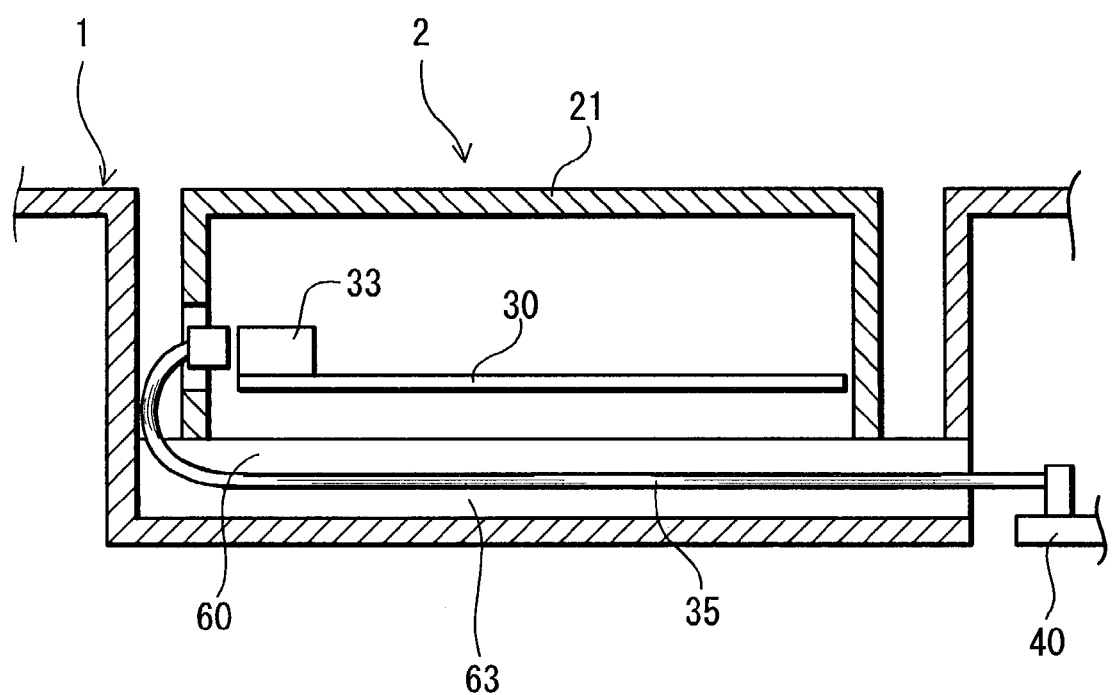
FIG. 10 is a sectional view showing a lead wire and its accommodation in an intercom apparatus of the invention.

In another embodiment of the electrical connection, as shown in FIGS. 2 and 10, a lead wire 35 of sufficient length to allow the terminal unit 2 to be pulled out from the intercom master station 1 is stored in a storage space 63 within the mounting bracket 60 so that it is stored below the terminal unit 2. This lead wire 35 electrically connecting the intercom master station 1 and the terminal unit 2 is passed through a lead wire guide 24 (see, FIG. 4(b)) and then connected to the chassis 21 of the terminal unit 2.

Figure 7:
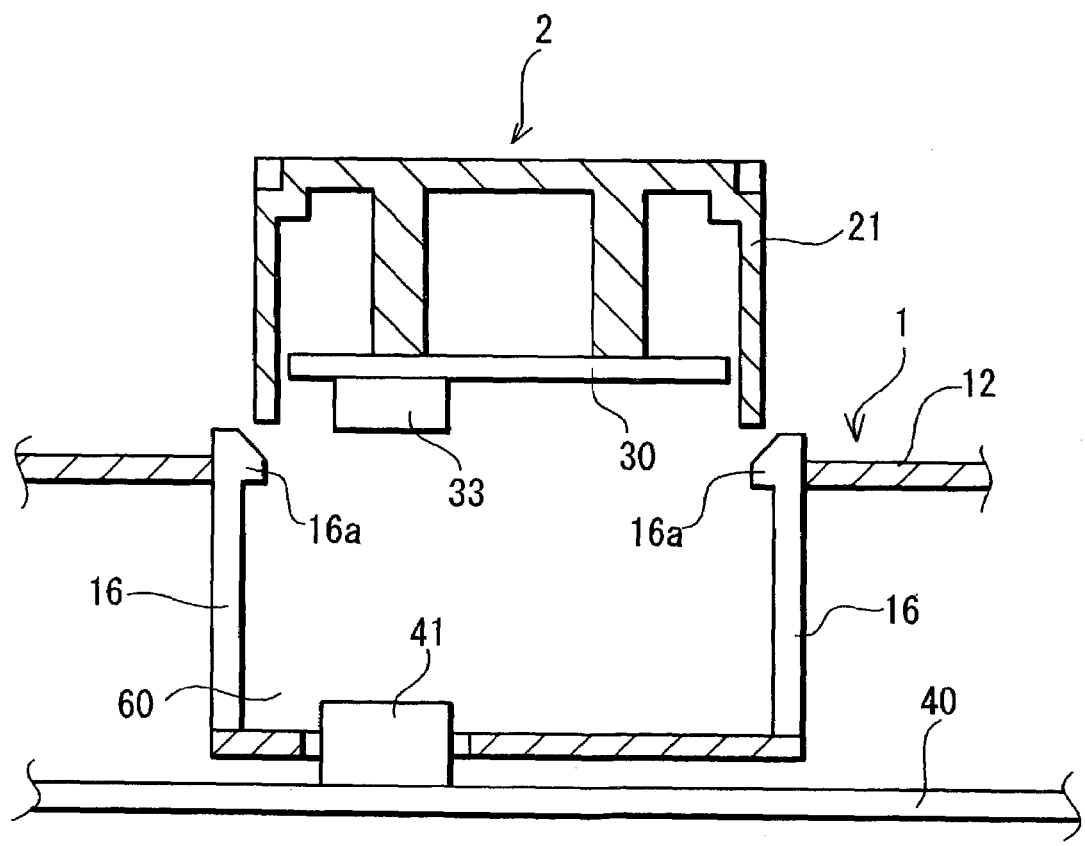
FIG. 7 is a partial schematic view in cross-section illustrating another embodiment of a connection of an intercom master station and a terminal unit in an intercom apparatus of the invention.

In another embodiment, as shown in FIG. 7, the terminal unit 2 is fixed by being pushed into the mounting bracket 60 of the intercom master station 1 by locking arms 16 having inward directed claws 16a. Upon pushing the terminal unit 2 into the intercom master station 1, the locking parts 16 bend outward so that fully inserted the terminal external chassis 21 is fit to the locking parts 16 and its removal is blocked by the inward directed claws 16a. The terminal unit 2 is thereby surely fixed to the intercom master station 1.

Figure 8:
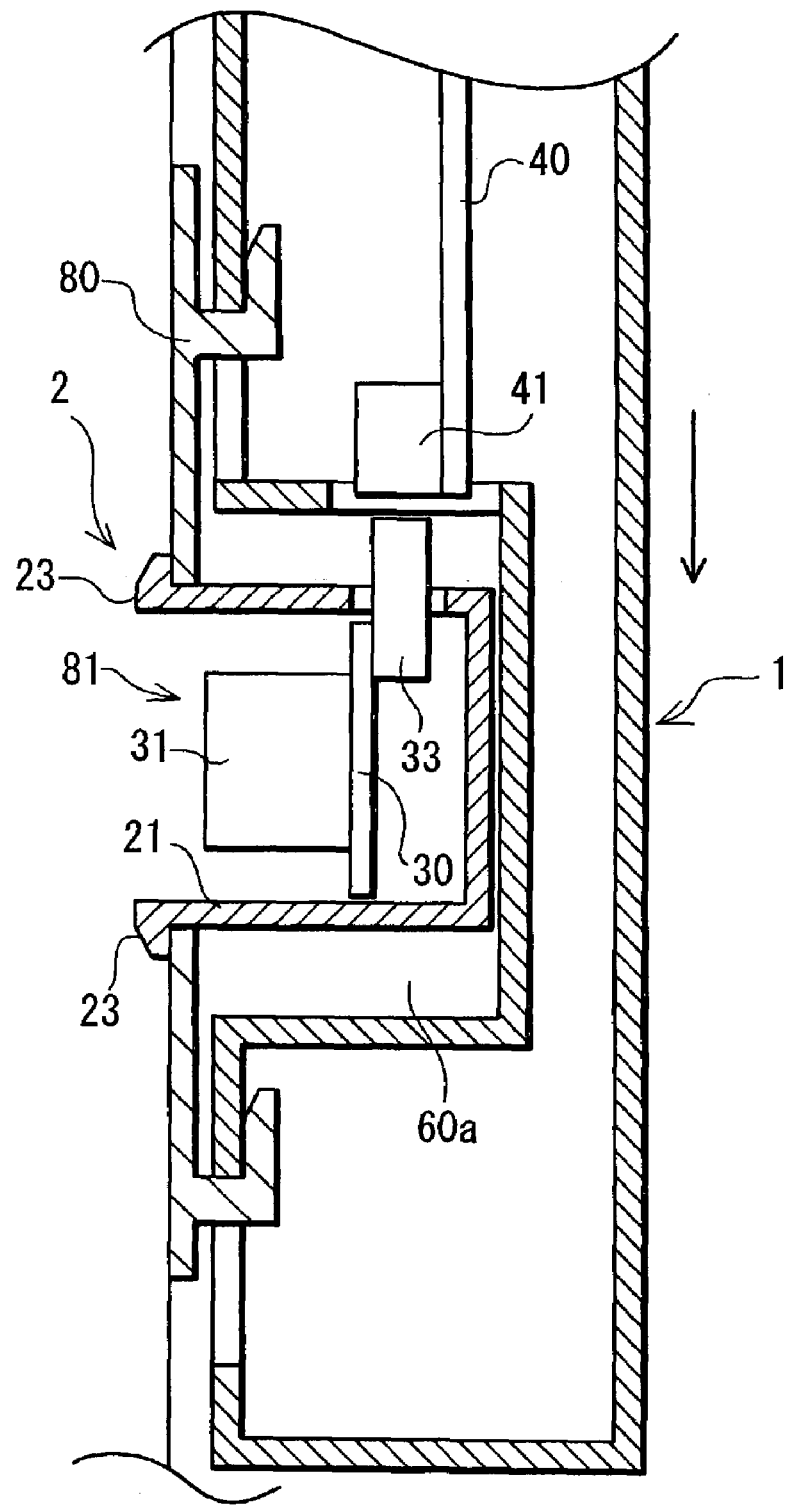
FIG. 8 is a cross-sectional view of a wall mounting unit in an intercom apparatus of the invention.

FIG. 8 shows an embodiment for mounting the terminal unit 2 and the intercom master station 1 when the intercom master station 1 is mounted on a wall. As shown in FIG. 8, a storage space 60a for storing the terminal unit 2 is provided in the intercom master station 1, and the terminal unit 2 is provided with locking parts 23 comprising outward directed claws. When the terminal unit 2 is inserted within an opening 81 of a wall hanging attachment 80, the locking parts 23 of the terminal unit 2 are engaged and locked with the opening 81 of the wall hanging attachment 80.

In this embodiment, a wire connection is temporarily made without mounting the intercom master station 1, and in this case, the terminal unit 2 is stored by engaging the locking parts 23 on the terminal unit 2 within the opening 81 of the wall hanging attachment 80. In this state, the terminal unit 2 can be kept fixed to the wall. Thereafter, the intercom master station 1 is permanently mounted and the terminal unit 2 can be easily mounted therein.

Further, as shown in FIG. 8, mere insertion of the terminal unit makes an electrical connection of a connector housing 41 on the main board 40, which is disposed in the intercom master station 1, and the connector 33 on the terminal board 30 which is disposed in the terminal unit 2.

In addition, in the above embodiment, while the terminal unit 2 and the wall hanging attachment 80 were described as separate, they may be integrally formed.

Figure 9:
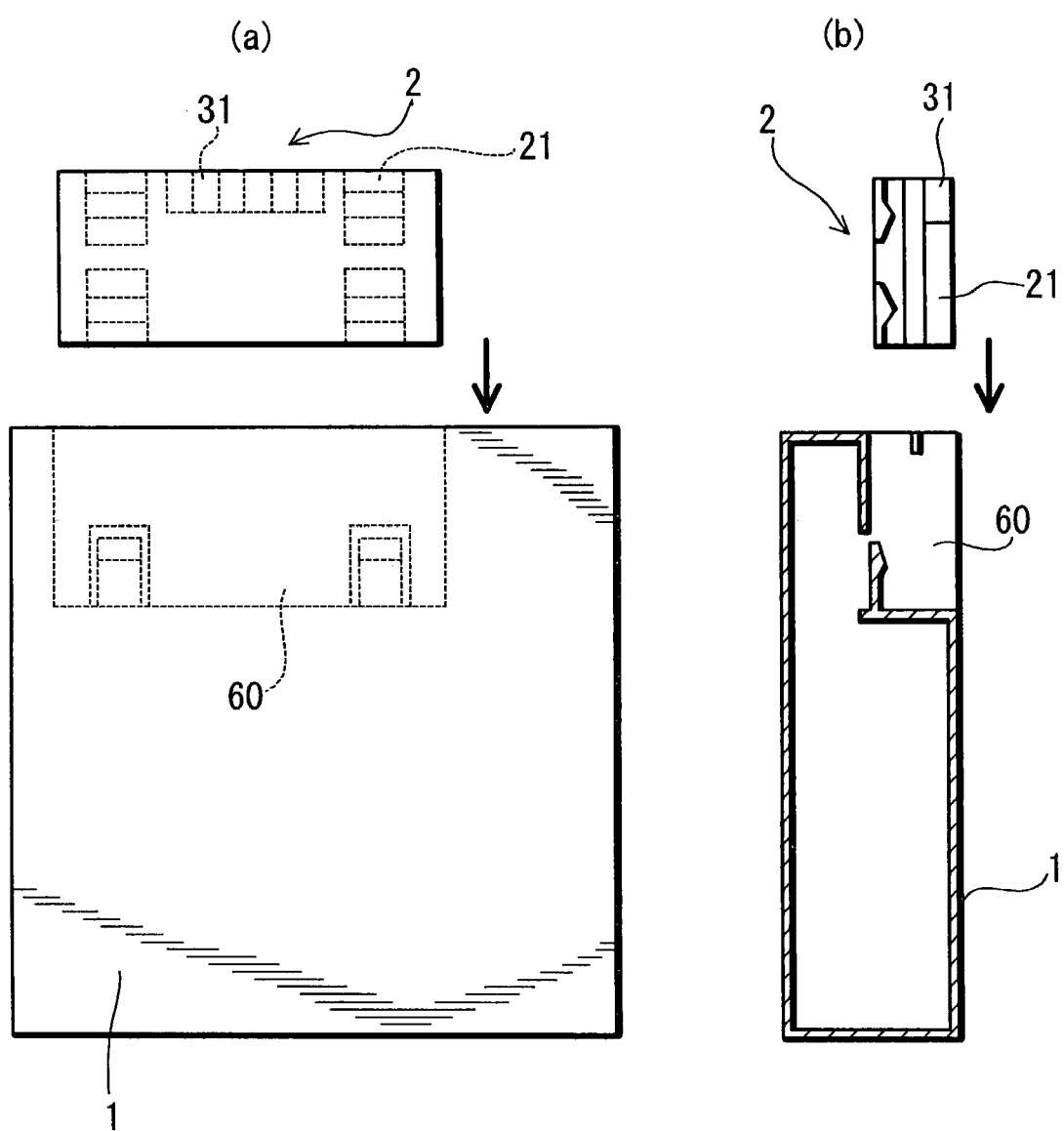
FIGS. 9(a) and 9(b) are, respectively, a rear elevation view and a sectional side view of one embodiment of an intercom master station and a terminal outside chassis in an intercom apparatus of the invention.

Further, as shown in FIGS. 9(a) and 9(b), the terminal chassis 21 may form part of an outer casing of the intercom master station 1. In this case, the station-to-station wiring of the main line communication path may be exposed by mounting the terminals 31 of the terminal unit 2 on a side surface of the intercom master station 1.

As is apparent from the foregoing explanation, according to an intercom apparatus of the invention, by utilizing a terminal unit which can be removed from an intercom master station, the entire apparatus never becomes inoperative even when the intercom master station has a defect.

Further, during the period between installation and occupancy, the terminal unit can be removed so that a theft can be prevented.

What is claimed is:

1. An intercom apparatus comprising:
    at least one entrance substation which is disposed at an entrance;
    a plurality of intercom master stations which are disposed in residential rooms and called from said entrance substation through a main line to intercommunicate with said entrance substation bilaterally, each of said plurality of intercom master stations comprising a mounting bracket;
    a plurality of terminal units, each of said terminal units being received in a mounting bracket and being removable therefrom as needed without changing a wire connection within either the intercom master station or the terminal unit, each of said terminal units having terminals for connecting wiring between the plurality of intercom master stations by station-to-station spanning wiring to form said main line and a terminal board for mounting said terminals and establishing an electrical connection of said main line by said station-to-station spanning wiring; and
    wherein each of said terminal units has a projection which is inserted into a guide groove in the mounting bracket of said intercom master station, and each of said intercom master stations has locking parts for holding said terminal unit to the intercom master station by engaging an end face of an external chassis of said terminal unit, which covers said terminals and said terminal board, upon insertion and subsequent movement orthogonal to the direction of insertion of said terminal unit.

2. The intercom apparatus according to claim 1, wherein said mounting bracket is disposed at a backside of said intercom master station.

3. The intercom apparatus according to claim 1, wherein upon insertion of said terminal unit into said intercom master station, an electrical connection is made by insertion of a connector on said terminal board into a socket on a main printed circuit board inside said intercom master station.

4. The intercom apparatus according to claim 1, wherein said mounting bracket has a storage space for storing, beneath said terminal unit, a lead wire for making an electrical connection between said intercom master station and said terminal unit.

5. The intercom apparatus according to claim 1, wherein said terminal exterior chassis forms part of an outer housing of said intercom master station.

6. An intercom apparatus comprising:
    at least one entrance substation which is disposed at an entrance;
    a plurality of intercom master stations which are disposed in residential rooms and called from said entrance substation through a main line to intercommunicate with said entrance substation bilaterally, each of said plurality of intercom master stations comprising a mounting bracket;
    a plurality of terminal units, each of said terminal units being received in a mounting bracket and being removable therefrom as needed without changing a wire connection within either the intercom master station or the terminal unit, each of said terminal units having terminals for connecting wiring between the plurality of intercom master stations by station-to-station spanning wiring to form said main line and a terminal board for mounting said terminals and establishing an electrical connection of said main line by said station-to-station spanning wiring; and
    wherein each of said plurality of terminal units further comprises an exterior chassis housing said terminal board and said terminals, and wherein said mounting bracket comprises locking parts for engaging said exterior chassis of said terminal unit upon pushing said terminal unit into said intercom master station.

7. The intercom apparatus according to claim 6, wherein upon insertion of said terminal unit into said intercom master station, an electrical connection is made by insertion of a connector on said terminal board into a socket on a main printed circuit board inside said intercom master station.

8. The intercom apparatus according to claim 6, wherein said terminal exterior chassis forms part of an outer housing of said intercom master station.

9. An intercom apparatus comprising:
    at least one entrance substation which is disposed at an entrance;
    a plurality of intercom master stations which are disposed in residential rooms and called from said entrance substation through a main line to intercommunicate with said entrance substation bilaterally, each of said plurality of intercom master stations comprising casing with a back surface, a CRT module mounted within said casing, and a mounting bracket on said back surface; and
    a plurality of terminal units, each of said terminal units being received in a mounting bracket, being mounted in a space between said back surface and said CRT module, and being removable from said mounting bracket as needed without changing a wire connection within either the intercom master station or the terminal unit, each of said terminal units having terminals for connecting wiring between the plurality of intercom master stations by station-to-station spanning wiring to form said main line and a terminal board for mounting said terminals and establishing an electrical connection of said main line by said station-to-station spanning wiring; and
    wherein each of said CRT modules has a monitor screen which displays a picture taken by a camera of said entrance substation and a rear surface which curves toward one edge of said monitor screen to form a narrowed portion of said CRT module, said space extending between said narrowed portion and said back surface.

10. An intercom apparatus comprising:

at least one entrance substation which is disposed at an entrance;

a plurality of intercom master stations which are disposed in residential rooms and called from said entrance substation through a main line to intercommunicate with said entrance substation bilaterally, each of said plurality of intercom master stations comprising a mounting bracket;

a plurality of terminal units, each of said terminal units being received in a mounting bracket and being removable therefrom as needed without changing a wire connection within either the intercom master station or the terminal unit, each of said terminal units having terminals for connecting wiring between the plurality of intercom master stations by station-to-station spanning wiring to form said main line and a terminal board for mounting said terminals and establishing an electrical connection of said main line by said station-to-station spanning wiring;

wherein said mounting bracket has a storage space for storing, beneath said terminal unit, a lead wire for making an electrical connection between said intercom master station and said terminal unit; and wherein each of said terminal units further comprises an exterior chassis housing said terminal board and said terminals, said exterior chassis having a lead wire guide for guiding the lead wire and having a storage space through which said lead wire extends from a connection to said intercom master station at one end of said storage space to a connector at a distal end, at an opposite end of said storage space, for connecting with said terminal unit.

* * * * *